United States Patent
Giovannini et al.

(10) Patent No.: US 10,872,287 B2
(45) Date of Patent: Dec. 22, 2020

(54) CLOSURE MEMBER

(71) Applicant: GCL INTERNATIONAL SARL, Luxembourg (LU)

(72) Inventors: Marco Giovannini, Luxembourg (LU); Piero Cavigliasso, Kockelscheuer (LU); Davide Capra, Leudelange (LU); Luca Viale, Alessandria (IT)

(73) Assignee: GCL INTERNATIONAL SARL, Luxembourg (LU)

( * ) Notice: Subject to any disclaimer, the term of this patent is extended or adjusted under 35 U.S.C. 154(b) by 0 days.

(21) Appl. No.: 16/743,986

(22) Filed: Jan. 15, 2020

(65) Prior Publication Data

US 2020/0193262 A1    Jun. 18, 2020

Related U.S. Application Data

(63) Continuation of application No. PCT/EP2017/076343, filed on Oct. 16, 2017.

(51) Int. Cl.
| | |
|---|---|
| *G06K 19/077* | (2006.01) |
| *B65D 55/00* | (2006.01) |
| *B65D 41/02* | (2006.01) |
| *B65D 55/02* | (2006.01) |

(52) U.S. Cl.
CPC ....... *G06K 19/07773* (2013.01); *B65D 41/02* (2013.01); *B65D 55/00* (2013.01); *G06K 19/077* (2013.01); *G06K 19/07749* (2013.01); *G06K 19/07771* (2013.01); *G06K 19/07798* (2013.01); *B65D 55/028* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,126,479 B2* | 10/2006 | Claessens | ............ | B65D 51/245 340/572.1 |
| 7,583,194 B2* | 9/2009 | Appalucci | ............ | B65D 25/205 340/10.1 |
| 7,830,263 B2* | 11/2010 | Fogg | ................ | G06K 19/07786 235/439 |

(Continued)

FOREIGN PATENT DOCUMENTS

| | | |
|---|---|---|
| EP | 2587414 A1 | 5/2013 |
| EP | 2865607 A1 | 4/2015 |

(Continued)

OTHER PUBLICATIONS

Foreign Communication from a Related Counterpart Application, International Preliminary Report on Patentability dated Jan. 22, 2020, International Application No. PCT/EP2017/076343 filed on Oct. 16, 2017.

(Continued)

*Primary Examiner* — Christle I Marshall (57) ABSTRACT

The invention provides a closure member (10, 110) for covering and/or closing a container (100, 200), in particular a bottle, the closure member (10, 110) comprising: a shell element (13, 113) comprising an opening (13*d*, 113*d*), the shell element (13, 113) being at least partially made of a conductive material, and a transponder (20, 120) comprising an antenna, the antenna being arranged at the opening (13*d*, 113*d*).

18 Claims, 5 Drawing Sheets

(56) References Cited

U.S. PATENT DOCUMENTS

| | | | | |
|---|---|---|---|---|
| 7,843,346 B2* | 11/2010 | Fogg | ................. | G06K 19/04 340/572.1 |
| 7,973,664 B1* | 7/2011 | Lambert | ............. | B29C 65/3644 235/385 |
| 8,973,833 B2* | 3/2015 | Kikuchi | ........... | G06K 19/07749 235/488 |
| 9,589,226 B2* | 3/2017 | Elizondo, II | ..... | G06K 19/07786 |
| 10,467,519 B2* | 11/2019 | Yamaoka | .............. | G06K 19/077 |
| 2002/0183883 A1 | 12/2002 | Carr et al. | | |
| 2007/0296599 A1* | 12/2007 | Wang | ................... | B65D 55/028 340/572.8 |
| 2009/0267729 A1* | 10/2009 | Rowe | ............... | G06K 19/07758 340/5.8 |
| 2009/0306620 A1* | 12/2009 | Thilly | ................. | B65D 51/002 604/415 |
| 2011/0063786 A1* | 3/2011 | Kikuchi | ................. | B65D 41/62 361/679.01 |
| 2013/0284814 A1* | 10/2013 | Huang | ................. | G06K 19/027 235/492 |
| 2014/0184390 A1* | 7/2014 | Elizondo, II | ..... | G06K 19/07786 340/10.1 |
| 2015/0235234 A1 | 8/2015 | Hoegh-Guldberg | | |
| 2017/0183135 A1* | 6/2017 | Pic | ..................... | B65D 39/0058 |
| 2017/0297790 A1* | 10/2017 | Porte | ...................... | B65D 1/023 |
| 2017/0316302 A1* | 11/2017 | Clere | ................. | G06K 19/0723 |

FOREIGN PATENT DOCUMENTS

| | | |
|---|---|---|
| WO | 2005024745 A2 | 3/2005 |
| WO | 2019076430 A1 | 4/2019 |

OTHER PUBLICATIONS

Foreign Communication from a Related Counterpart Application, International Search Report and Written Opinion dated Jul. 10, 2018, International Application No. PCT/EP2017/076343 filed on Oct. 16, 2017.

* cited by examiner

CLOSURE MEMBER

CROSS-REFERENCE TO RELATED APPLICATIONS

The present application claims priority to International Application No. PCT/EP2017/076343, filed Oct. 16, 2017, entitled "CLOSURE MEMBER," which is incorporated herein by reference in its entirety for all purposes.

TECHNICAL FIELD

The present invention refers to a closure member for covering and/or closing a container like a bottle, canister, or the like. More specifically, the invention relates to a closure member provided with a transponder or the like.

BACKGROUND

In order to provide the customer, user or consumer of the container with information about the container's products or the container history, such as best before dates, information related to brand, product history, product info, duties info, best before dates etc., known closure members include a transponder in which the relevant data is stored and which can be read out by suitable receiving devices. In particular, as examples for transponders, closures comprise an RFID-tag (or RFID-transponder) for providing this information to the consumer. Such RFID tags (sometimes called IC tags), may comprise low frequency, high frequency or UHF RFID tags according to the specific application. If the RFID-tag or a part thereof is damaged, readout is affected and the consumer can recognize that the closure member has been removed or that an attempt to manipulate the closure member should be considered.

An RFID-tag generally comprises a chip and an antenna, as well as sometimes a piece of loop separately connected to the chip. Either the antenna can be interrupted when opening the closure member, or the piece of loop can be interrupted to thus change the state of the chip. In particular, the interruption of the antenna or loop is effected by rotating the closure member with the tag with respect to the neck of the bottle/neck label).

If, in the unopened state, the chip is interrogated when a reading device (for example in a mobile phone) is brought close to the antenna, the transponder in the RFID tag communicates its unopened state. If the transponder is interrogated after the piece of the loop has been interrupted upon opening the closure, it communicates that the closure has been opened. If the antenna has been interrupted, readout is no longer possible, and the user should be wary.

In the industry, it is particularly desired to provide high-value beverages such as wine and spirits with closures like the above. However, closure members like the above are in some cases at least partially made of a metallic material, with the metallic material forming the outermost element of the closure. For example, the closure member may comprise a metallic shell.

But if the closure member is partially made of a metallic material, this metallic material interferes with the RFID-transponder because the RFID-transponder operates on the basis of electromagnetic fields which are affected by the metallic material of the closure member. This may lead to a situation where the RFID-transponder is prevented from being detected by a detector so that no communication is possible. In this case, the consumer might believe that the closure member has already been removed or opened, or that the closure member was manipulated. Also, a special implementation of such RFID-tags has recently become popular, the so-called NFC ("near field communication") tags, which are based on high frequency (HF)-RFID technology but operate only on very short ranges (of the order of a few centimetres). In this case, it is fundamental to solve the problem of attenuation and shielding of the antenna signal by the metallic material of the cover.

US 2015/0235234 A1 refers to a device for authenticating a bottle, which includes a neck having a foil capsule defined by a lower edge, and a marker having an electronic component and an antenna enabling communication with a readout apparatus, the electronic component and the antenna occupying an area A which corresponds to at least one portion of the surface of the marker. The marker is arranged to overlap the lower edge, and at least 25% of the area A covers the portion of the bottle located under and outside of the lower edge of the foil capsule in order to limit the disruptions induced by the foil capsule on the antenna. However, this means that the marker is visible and accessible from the outside, which is undesirable, and the marker's location on the neck makes the capping operation very difficult and, thus, expensive.

Another document is EP 2 865 607 A1 which refers to a composite container lid for a packing container. The packing container comprises an inner cap fitted onto the container mouth portion, an over-cap fitted onto the inner cap, and an IC tag, wherein an engaging means is provided between the inner surface of a skirt of the over-cap and the outer surface of a cylindrical wall of the inner cap. The IC tag comprises a resin film that includes an IC chip, an antenna and an unsealing detector circuit, and the IC tag is attached to the inner cap or to the over-cap in a manner that the unsealing detector circuit is broken by the motion of the over-cap relative to the inner cap caused in the step of unsealing the inner cap. In this case, communication from the antenna to the outside of the lid is ensured because the entire lid, i.e. inner cap and over-cap, are made of thermoplastic resin.

Despite the approaches to provide a closure member with a RFID-tag or the like which provides additional information for the consumer, in cases where a metal cover is used, feasibility and reliability of such configurations as well as convenience for the user suffers.

A metal cap is known from WO 2005/024745 A2 in which an RFID chip is mounted inside the cap and an antenna patch is mounted on an electrical insulator outside the metal cap. The antenna is connected to the chip by feed-through connections.

SUMMARY OF THE INVENTION

It is, therefore, an object of the invention to provide a closure member which has a shell or cover made at least partially of a conductive material and is provided with a transponder with improved reliability in terms of structure and function, as well as a good handling performance.

The subject-matter of claim 1 provides a closure member with features for addressing this object. Further preferred embodiments are mentioned in the dependent claims and/or outlined in the following description.

According to the invention, a closure member for covering and/or closing a container, in particular a bottle comprises a shell element comprising an opening provided in a top portion or a side portion of the shell element, the shell element being at least partially made of a conductive material, and a transponder comprising an antenna, in particular an RFID-tag, and being arranged in or below the opening, the antenna being arranged at the opening, wherein the antenna is arranged at the same level, or below or under the opening. Preferably, such closure member is a cap or lid for a bottle or similar containers. Advantageously, the shell element is entirely made of conductive material, such as for example a conductive foil or film.

An advantage of the closure member of the invention is that the transponder is accommodated in such manner that the antenna is arranged at the opening, and in detail, in or below the opening. It has in fact be found by the applicant that an opening is necessary for allowing communication between the antenna and external read-out devices regardless if the antenna is above (outside) or below the shell element. In other words, even a transponder antenna placed above or outside a closed conductive shell (i.e. without opening) will not work unless it is placed at a significant distance from the conductive surface of the shell. Thus, by virtue of the opening and the arrangement of the antenna, a good handling performance is provided while assuring that interference with conductive or metallic parts of the closure member is minimized or avoided. Further, since the shell element is at least partially (but preferably entirely) made of conductive material, the closure member is configured to provide a high quality appearance to the consumer. Here, it is preferred that the opening is provided at the top portion of shell element, i.e. at the top portion when the container is standing upright (normal use), even though other locations for the opening can be imagined, such as lateral locations (e.g. on the neck or side portion of a bottle).

Non-conductive as used herein is intended to mean a material whose conductivity is low enough so as not to attenuate significantly electromagnetic waves in the radio spectrum. In other words, a non-conductive material is also a non-shielding material in that it does not shield the electromagnetic waves in a manner that inhibits NFC- or RFID communication (transmissions).

While for reasons of achieving least interference from the conductive shell element, in an embodiment not forming part of the invention, the transponder might be placed above the opening (i.e. in front of it if seen from the outside), according to the invention the transponder is placed in the opening (i.e. at the same level of the opening), or below the opening. In this manner, it is better protected against mechanical damage by forces acting upon the closure during capping, transport or handling.

Advantageously, the antenna is arranged below the opening at a distance d of 10 mm or less, preferably 3 mm or less, and most preferably 1 mm or less from the level of the opening. In the present invention, "arranged below the opening" is intended as below the level of the opening, which is the imaginary surface defined by the upper or outer edges of the opening in the shell element. In fact, the shell element has a thickness t, in general about 0.2 to 0.5 mm.

The applicant has further found out that when the transponder antenna is arranged below the opening, it is advantageous that a dimension of the antenna $\varnothing_{Antenna}$, a dimension of the opening in the shell $\varnothing_{Hole}$, and the distance between the level of the opening and the antenna d obey the following relationships:

$$\varnothing_{Hole} - \varnothing_{Antenna} \geq 0.2d + 2 \text{ mm for } d \geq 0.64 \text{ mm} \quad (I.)$$

$$\varnothing_{Hole} - \varnothing_{Antenna} \geq -4.96d - 0.9 \text{ mm for } t \leq d < 0.64 \text{ mm} \quad (I'.)$$

with t being the thickness of the shell element at the opening. The term "dimension" indicates, for example, the diameter of a substantially circular antenna or opening, or alternatively one of the sides of a rectangular or quadratic antenna or opening.

In this range of opening and antenna dimensions, a sufficiently strong signal from the antenna can be received outside the closure, thus having a working transponder. It is noted that the distance d used in these and the following equations is an absolute value, without sign.

It is, however, particularly advantageous if the dimension of the antenna $\varnothing_{Antenna}$, the dimension of the opening in the shell $\varnothing_{Hole}$, and the distance between the level of the opening and the antenna d obey the following relationship:

$$\varnothing_{Hole} - \varnothing_{Antenna} \geq 0.26d \text{ for } d \geq 0 \text{ mm} \quad (II.)$$

It is particularly preferred if, when the antenna is arranged at the same level or below the opening, that the dimension of the antenna $\varnothing_{Antenna}$ is 2 mm smaller than the dimension of the opening in the shell $\varnothing_{Hole}$.

In an embodiment not part of the invention it is, as mentioned, contemplated that the antenna is arranged above the opening, preferably at a distance of less than 2 mm.

In this case of the antenna being above the opening, it has been found that it is advantageous if the dimension of the antenna $\varnothing_{Antenna}$, the dimension of the opening in the shell $\varnothing_{Hole}$, and the distance between the level of the opening and the antenna d obey the following relationship:

$$\varnothing_{Hole} - \varnothing_{Antenna} \geq -14.64d + 1.8 \text{ mm for } d > 0 \text{ mm} \quad (III.)$$

Thus, if the antenna is above the opening, its dimension may become larger than that of the opening, and by following the above relationship, optimum communication results and very low attenuation can be obtained.

In the above description, the "dimension" of the opening (hole) and of the antenna have been employed to describe the teaching with respect to the arrangement of the transponder. It is to be understood that the opening or the transponder antenna may have any suitable shape, such as circular, so that "dimension" in the above may be replaced by "diameter", or may have a rectangular shape, so that "dimension" may indicate the respective sides of such rectangular shape. In such a situation, $\varnothing_{Hole}$ may thus indicate the diameter of a circular opening, or the respective side of a rectangular opening, while $\varnothing_{Antenna}$ would indicate the diameter of a circular antenna or the corresponding sides of a rectangular antenna.

Preferably, the shell element comprises a metallic material, in particular aluminium, wherein it is preferred that the shell element is an aluminium foil. That is, while conductive materials in general are feasible in the framework of the invention, metallic materials are preferred because of their easy formability, suitable for example for magneto-forming or other forming processes during capping.

Preferably, the transponder is provided at a top portion or a side portion of the closure element. This allows for maximum design flexibility.

In a preferred embodiment, the closure member further comprises a closure element (also called over-cap), the closure element being configured to engage, directly or indirectly, with the container, and the closure element supporting the shell element and the cover element. That is, the shell element is arranged at least largely, but in general completely on the outside of closure element (over-cap). Direct engagement may occur, preferably, by a thread that engages with a corresponding thread on the bottle, but other direct engagement methods are envisaged, such as—in a non-limiting manner—tear rings, interference fit or the like.

Indirect engagement, on the other hand, occurs via an inner cap that is fixedly provided on the container opening, such as the bottle neck.

More particularly, the transponder is provided on the closure element, in particular at a top portion of the closure element. In this manner, the transponder and its antenna are provided on a stable component and can be mounted easily in a separate step, or in a common manufacturing step with the closure element.

In a preferred embodiment, the closure member further comprises a cover element, the cover element being made of a non-conductive material and being positioned such that the cover element closes the opening and covers the transponder.

Thereby, flexibility for design variations of the closure member is provided, since the transponder is covered by the cover element and can, therefore, be provided at a late (and preferably last) stage of manufacture, by simply placing it into the opening of the shell element and covering the opening with the cover element.

Preferably, the cover element is attached to the closure element by gluing, welding or a snap-fit connection. In this manner, the cover element is securely fastened against falling off and revealing the transponder, thereby protecting the transponder.

In a preferred embodiment, a top portion of the shell element covers an outer circumferential portion of cover element. This allows securely holding the shell element on the cover element and thus preventing it from moving and detaching from the closure member.

It is further preferred that the transponder has a circular shape and that a central portion of cover element covers the transponder. This shape is particularly suited for closures which are circularly symmetric, such as having a largely tubular shell element and a circular cover element, and allows using the least surface area of the cover element to cover the transponder.

In the present invention, the term "transponder" is used synonymously with IC tags, transponders, transceivers and the like, in particular RFID-tags of all kind, including NFC-tags, in general all circuitry that comprises an antenna and can be interrogated with electromagnetic waves, i.e. which receives and/or transmits such electromagnetic waves.

BRIEF DESCRIPTION OF THE DRAWINGS

The invention may be better understood by reference to the following specification disclosed in a preferred embodiment thereof and taken in conjunction with the following accompanying drawings in which.

The description and the accompanying drawings are to be construed by ways of example and not of limitation.

DETAILED DESCRIPTION OF PREFERRED EMBODIMENTS

Embodiments of the invention will be described in further detail in the following. Modifications of certain individual features in this context can be combined with other features, thereby providing additional embodiments.

Figure 1:
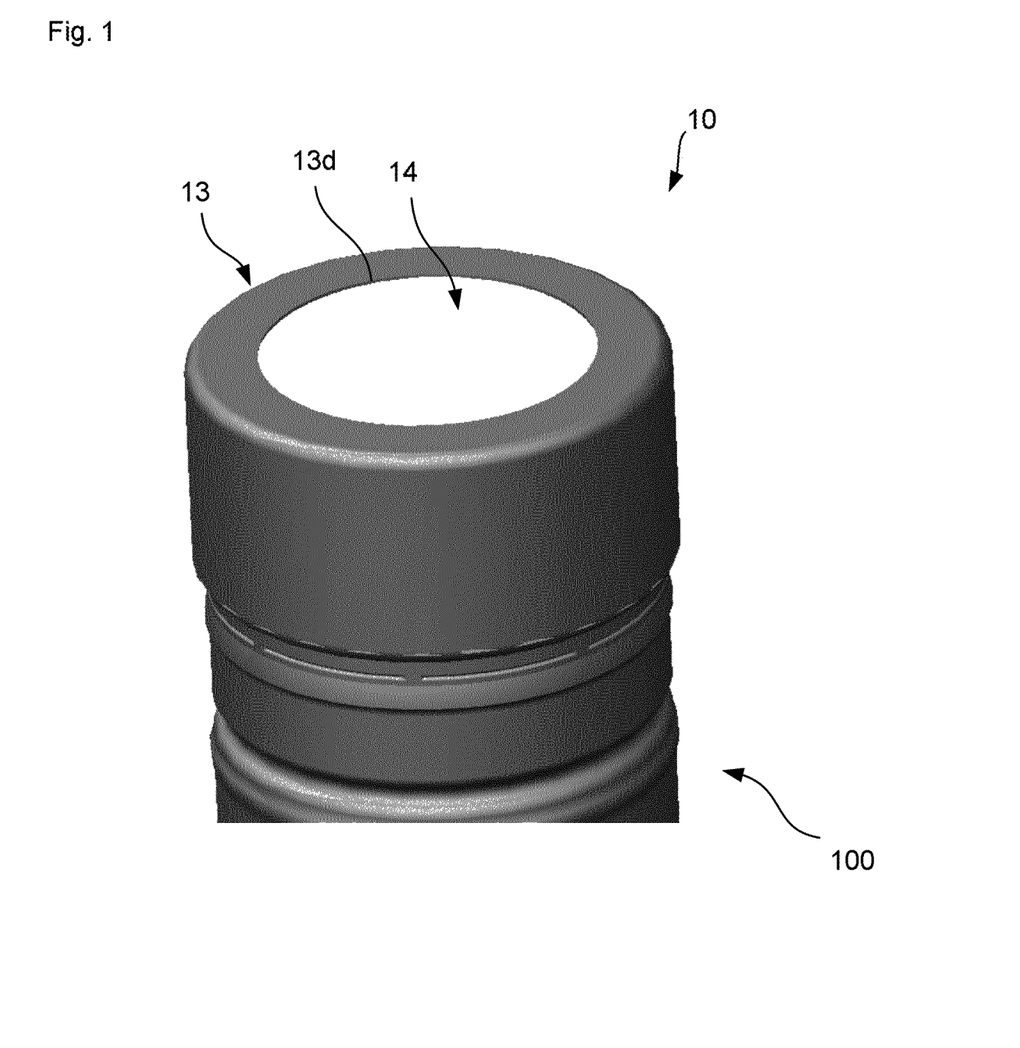
FIG. 1 is a perspective view of an embodiment of the invention.

FIG. 1 shows a closure member 10 attached to the neck of a bottle 100, which bottle 100, according to the present embodiment, may contain a beverage, like water, a soft-drink, wine, beer, spirits or the like. It is to be understood that the present invention is not limited to containers for beverages, but may be any type of container, such as for perfumes, technical liquids, or even solids such as powders, or gels etc.

The closure member 10 comprises a closure element or screw cap 11 which engages with an external thread provided on a neck of the bottle 100. The closure element 11 comprises a top portion 11a having, in plan view, a circular surface, and a side wall portion 11b extending along an exterior side wall of the bottle 100. The inner side of the side wall portion 11b of the closure element 11 is provided with an internal thread.

Figure 2:
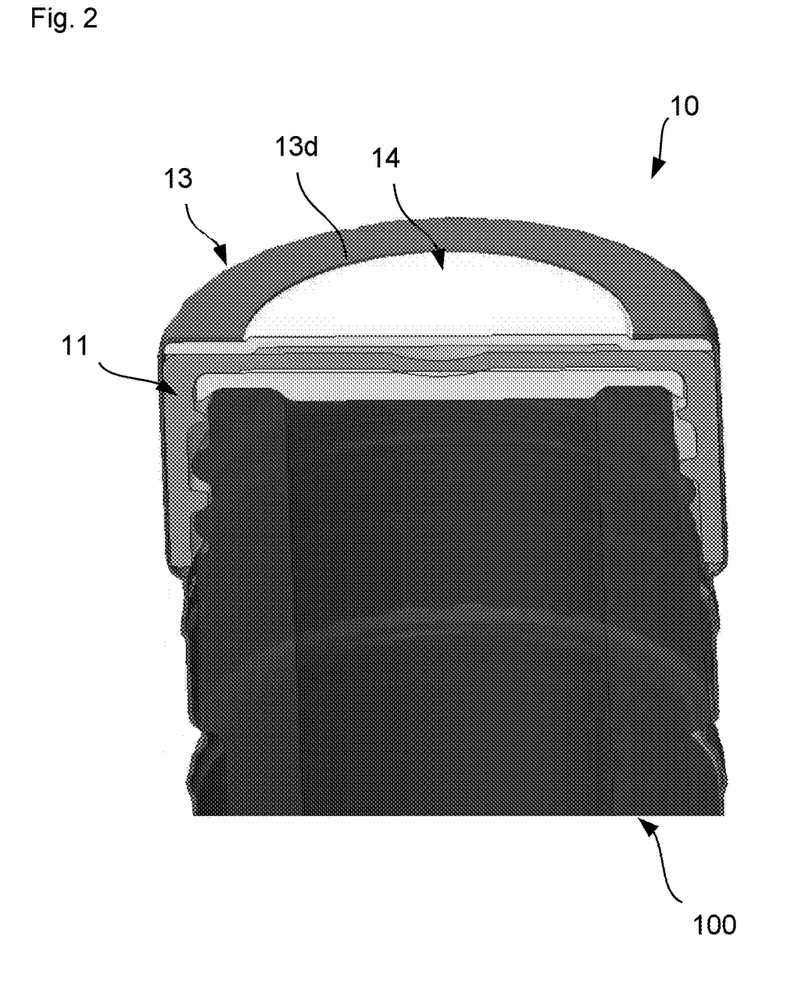
FIG. 2 is a perspective, cross-sectional view of the embodiment shown in FIG. 1.
Figure 3:
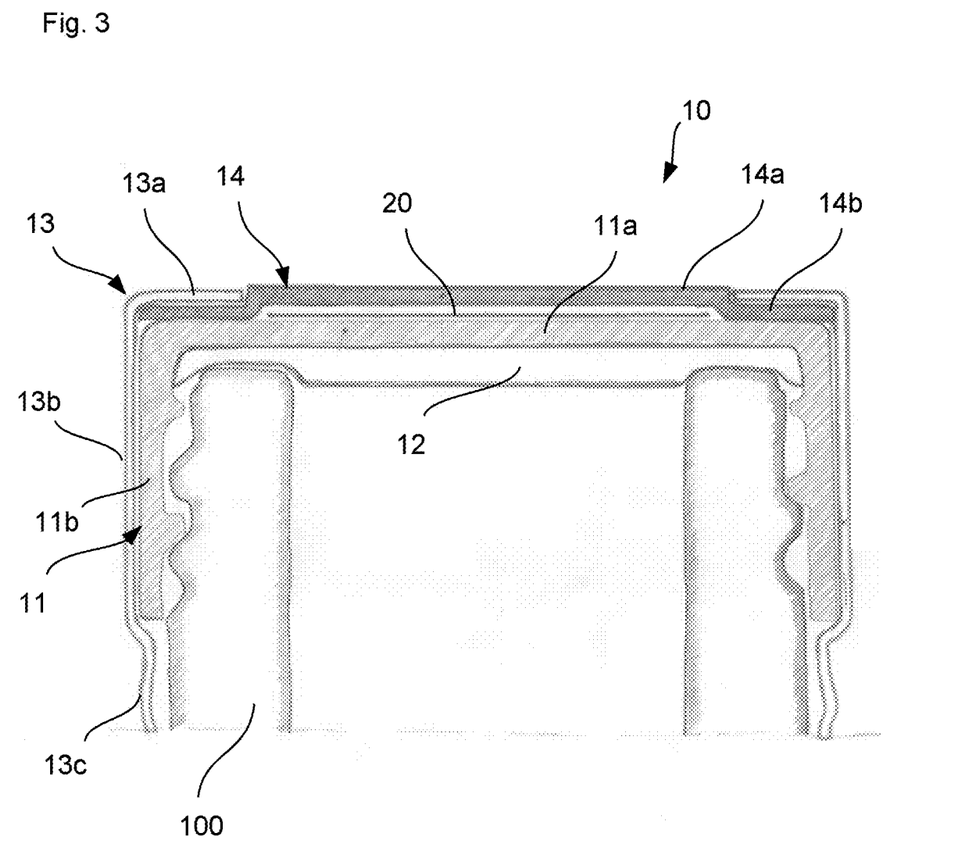
FIG. 3 provides a sectional view of the embodiment of FIG. 1 of the invention.

A sealing element 12 is attached to an inner side of the top portion 11a of the closure element 11, the sealing element 12 abutting to an upper side of the bottle 100 when the closure member 10 is in an engaged state.

On the upper side of the closure element 11, a cover element 14 is provided, which has, in plan view, a circular shape. An outer circumferential portion 14b of the cover element 14 is attached to the closure element 11, for example by gluing or welding the cover element 14 to the closure element 11. Alternatively, the cover element 14 may be attached to the closure element 11 by a snap-fit connection.

An inner circumferential portion 14a (central portion) of the cover element 14 is arranged so as to be spaced from the upper side of the closure element 11. In other words, a cavity is provided between the central portion 14a of the cover element 14 and the upper side of the closure element 11.

In the cavity, a transponder 20 is arranged, which transponder 20 is in particular attached to the upper side of the closure element. In an alternative embodiment, the transponder 20 may also be attached to the lower side of the cover element 14. The transponder 20 is, according to the present embodiment, a RFID-tag, in particular an NFC-tag. The size and the position of the transponder 20 will be described below in further detail. In the present exemplary embodiment, the antenna of the transponder 20 is circular. Also, in this embodiment it is preferred that the diameter of the antenna is about 2 mm smaller than the diameter of the opening. In another embodiment, the diameter (dimension) of the NFC-tag may be substantially equal to the diameter (dimension) of the opening.

On an exterior side of the side wall portion 11b of closure element 11 and extending to the outer circumferential portion 14b of the cover element 14, an electrically conductive shell element 13 is arranged, which electrically conductive shell element is according to the present embodiment an aluminium foil.

The electrically conductive shell element 13 comprises a top portion 13a, which is provided on an upper side of the outer circumferential portion 14b of the cover element 14. An opening 13d is provided in the top portion 13a of the shell element 13.

The shell element 13 further comprises a side wall portion 13b extending on outer circumferential side of the side wall portion 11b of the closure element 11, and end portion 13c which extends on outer circumferential side of the neck of the bottle 100.

Figure 4:
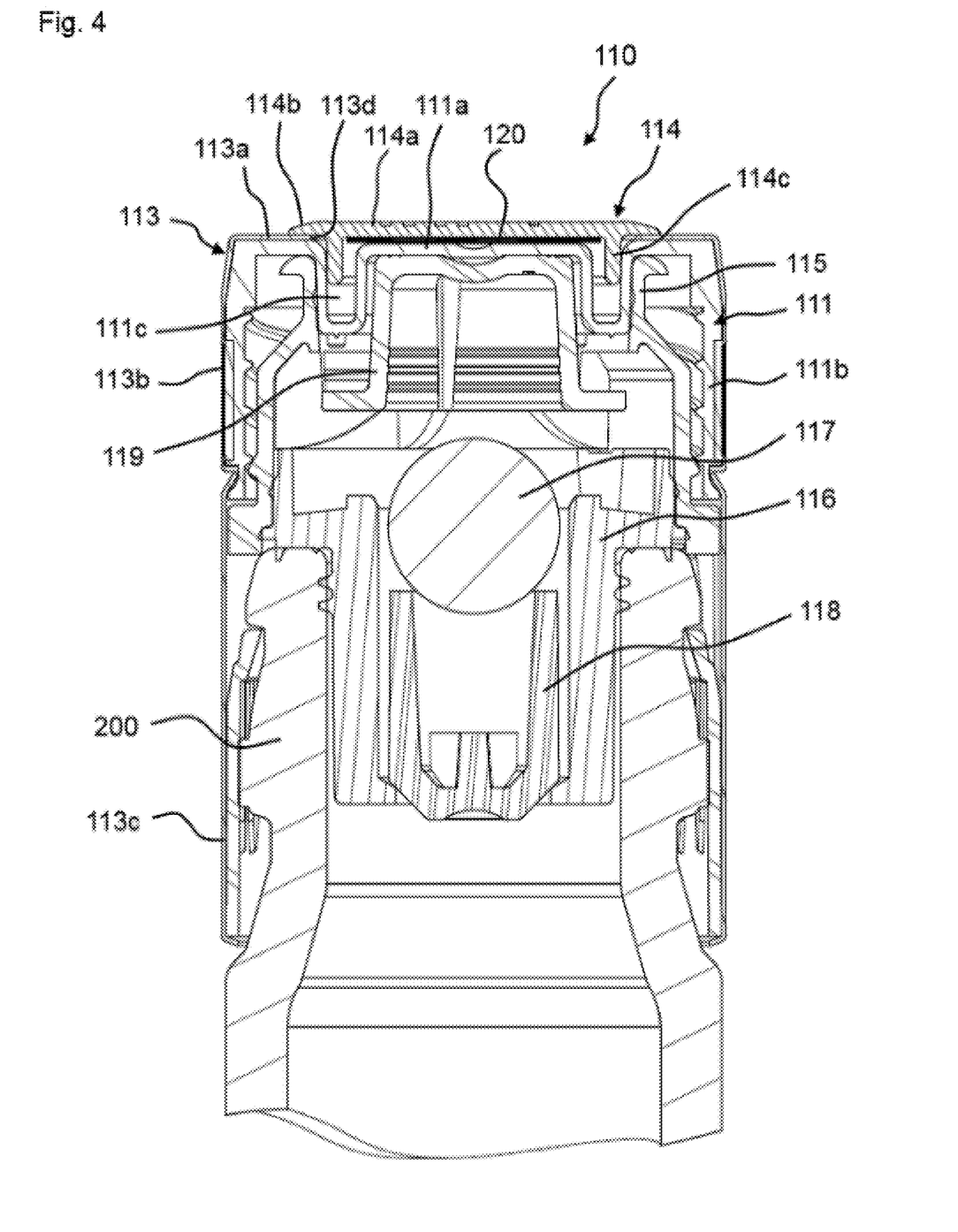
FIG. 4 provides a sectional view of another embodiment of the invention.

FIG. 4 shows another embodiment of the closure member of the invention. This closure member 110 is designed for bottles 200 which, once emptied, shall not be refilled again, such as bottles for high-value liquids. The closure member 110 comprises a shell element 113 which surrounds a closure element or screw cap 111. The closure element 111 is provided with a thread to engage with a pourer 115 which in turn is fixedly connected with a tubular washer 116 that is irremovably fastened within the neck of the bottle 200.

The closure element 111 comprises a top portion 111a that is provided with a circular groove 111c, and a side wall portion 111b that is provided with the thread.

On its upper side, the closure element 111 is provided with a cover element 114 in order to cover and close the opening 113d of the shell element. The cover element 114 has a central portion 114a above the top portion of the closure element 111a, an outer circumferential portion 114b, and leg portions 114c that engage by snap-fit into the groove 111c in order to fasten the cover element 114 to the closure element 111. The central portion 114a again is spaced apart by a small distance from the underlying top portion 111a of the closure element 111 to thereby form a cavity for a transponder 120. Here, the transponder 120 is an NFC-tag having a substantially circular antenna, and is attached (for example by gluing) to the top portion 111a of the closure element 111. In this embodiment, the NFC-tag 120 is arranged at a distance of about 0.5 mm from the level of the opening 113d in the shell element 113. The diameter of the NFC-tag 120 is 2 mm smaller than the diameter of the opening 113d. Such dimensions have been derived by obeying equation (II.) which will be discussed, along with other possible values for size and position of the transponder, in further detail below. In another embodiment, the diameter (dimension) of the NFC-tag may be substantially equal to the diameter (dimension) of the opening.

The shell element 113 is made of electrically conductive material, for example aluminium, and has a structure similar to the embodiment of FIGS. 1-3 in that it comprises a top portion 113a in which a circular opening or hole 113d is formed. In this embodiment, the outer circumferential portion 114b overlies the top portion 113a of the shell element. Moreover, the shell element 113 further comprises a side wall portion 113b, which extends the outer circumferential side of the side wall portion 111b of the closure element 111. In this embodiment, the end portion 113c of the shell element 113 is separately provided from the sidewall portion 113b so that it remains attached to the neck of the bottle 200 also when the screw cap 111 is unscrewed and the bottle opened.

In the top portion of the pourer 115, an upper sphere seat 119 is provided that abuts the top portion 111a of the closure element (screw) 111. Within the washer 116, a plastic valve seat 118 is arranged which is normally closed by a glass sphere 117 to form a non-refillable system. When the bottle is turned for pouring, the glass sphere 117 moves into an upper sphere seat 119 so that the contents of the bottle can flow out through the valve 118 and the pourer 115. As soon as the bottle is turned back towards the upright position, the sphere 117 moves into the valve 118 and closes it, so that the bottle cannot be re-filled again.

Figure 5:
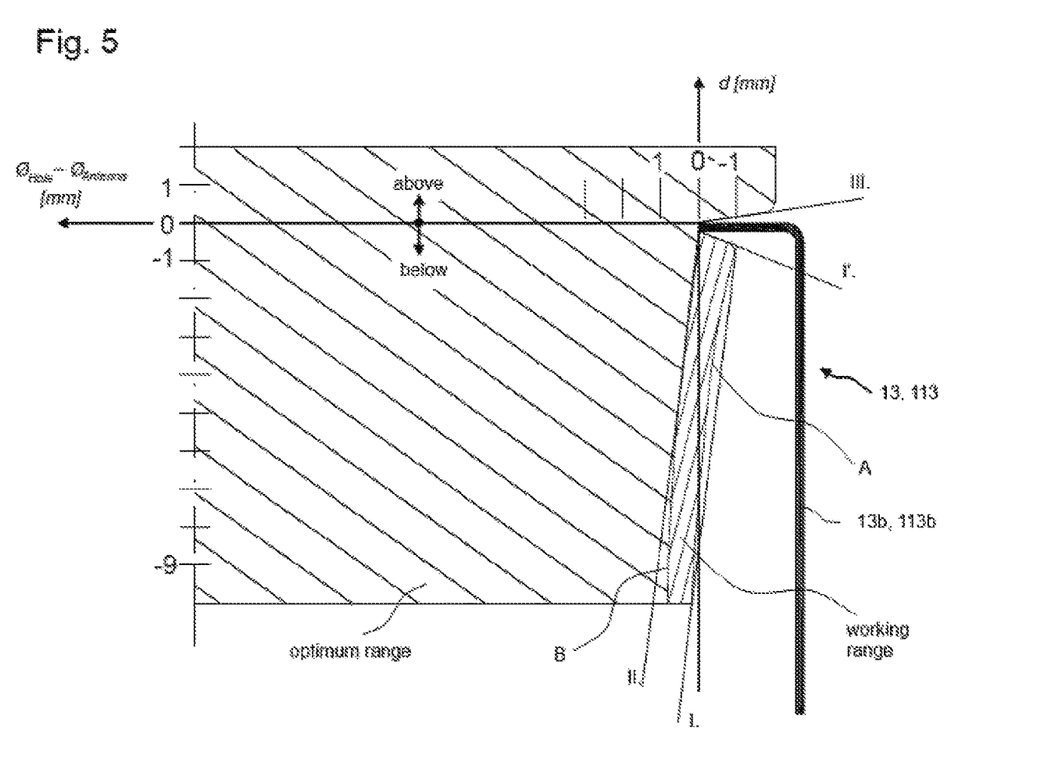
FIG. 5 shows an example for evaluating a position and size of a transponder antenna and opening according to the invention.

Hereafter, the possible arrangements of the transponder (RFID-tag) 20, 120 in the closure member 10, 110 is described in further detail, as determined within the framework of this invention and applicable both to the embodiments of FIGS. 1 to 3, and 4. Reference is made in particular to FIG. 5, which shows an example for determining a position and size of a transponder antenna and an opening in the shell element. The relation between the distance from the level of the opening and the size of the transponder antenna and hole determines the performance of the closure member with transponder, i.e. if a signal can reliably be acquired by a receiver (for example an NFC-receiver within a mobile phone). Here, it shall be noted that not all such receivers have the same sensitivity, which can lead to problems in particular with NFC-transponders since the distances at which communication between transponder and receiver can occur are very small, below about 20 or 30 mm.

In FIG. 5, the relationship between $\varnothing_{Hole}$, the diameter of the opening, $\varnothing_{Antenna}$ the diameter of the antenna, and the distance d between the transponder antenna and the level of the opening, i.e. the surface defined by the outer or upper edges of the opening, is illustrated.

In fact, the Applicant has performed reading/communication tests with several NFC-enabled mobile phones and has found out that for a certain range (set of values) of the distance d between the transponder antenna and the level of the opening, the diameter of the antenna $\varnothing_{Antenna}$ and the diameter of the opening $\varnothing_{Hole}$, roughly ⅔ of tested devices achieve reliable and consistent communication with the transponder in the closure member. This range is called "working range" in FIG. 5. A range (set of values) where all tested devices achieve reliable communication is called "optimum range" in FIG. 5.

FIG. 5 shows a stylised section of the inventive closure member from the centre line to the outer edge of the container (bottle) neck, in which only the shell element 13, 113 is indicated. The vertical axis indicates the distance d in mm of the transponder antenna above (positive values) and below (negative values) the level of the opening, and thus the position at which the transponder shall be placed. It is noted that in the following equations the distance d enters as an absolute value, without sign. The level of the opening corresponds to d=0 mm. The horizontal axis indicates the difference in mm between $\varnothing_{Hole}$ and $\varnothing_{Antenna}$. As can be seen, there is a "working range" (cross-hatched densely from left bottom to right top) delimited by boundaries A and B, in which the diameter of the antenna is such that a working communication can be established with many receiver devices. This "working range" is defined for antenna positions below the opening.

To the left of boundary B, sill in the area below the opening, there is the "optimum range" (cross-hatched widely from lower right to upper left) in which reliable communications were achieved with all tested receiver devices. These boundaries have been approximated with linear equations (I.), (I.') and (II.) that define a limit on the relationship between $\varnothing_{Hole}$ and $\varnothing_{Antenna}$ as a function of d, and thus an easily workable teaching for the engineer designing closure members with transponders, reproduced in the following $$\varnothing_{Hole} - \varnothing_{Antenna} \geq 0.2d + 2 \text{ mm for } d \geq 0.64 \text{ mm} \quad (I.)$$

$$\varnothing_{Hole} - \varnothing_{Antenna} \geq -4.96d - 0.9 \text{ mm for } t \leq d < 0.64 \text{ mm} \quad (I'.)$$

t is the thickness of the shell element at the opening, and will—without limitation—in general be between 0.2 and 0.5 mm for standard aluminium foils. The reason why equation (I'.) is defined only for distances larger than t is that for d<t one enters already the "optimum range" where the difference ø$_{Hole}$−ø$_{Antenna}$ may follow equation (II), and may be 0 mm, i.e. the antenna diameter may be equal to the opening (hole) diameter.

In the case that the antenna is arranged above the opening of the shell element, again a relationship between ø$_{Hole}$, the diameter of the opening, ø$_{Antenna}$ the diameter of the antenna, and the distance d between the transponder antenna and the level of the opening can be obtained. Here, there hasn't been any distinction of ranges (set of values) since all tested NFC-receivers managed to establish reliable communication with the NFC-transponder in the wide-cross-hatched area, i.e. the "optimum range". ø$_{Hole}$, ø$_{Antenna}$ and d have the following relationship above the opening:

$$\text{ø}_{Hole}-\text{ø}_{Antenna} \geq -14.64d+1.8 \text{ mm for } d>0 \text{ mm} \quad (III.)$$

Since many possible embodiments may be made of the invention without departing from the scope thereof, it is to be understood that all the explanations herein or aspects shown in the drawings are to be interpreted as illustrative and not in a limiting sense.

Figure 6A:
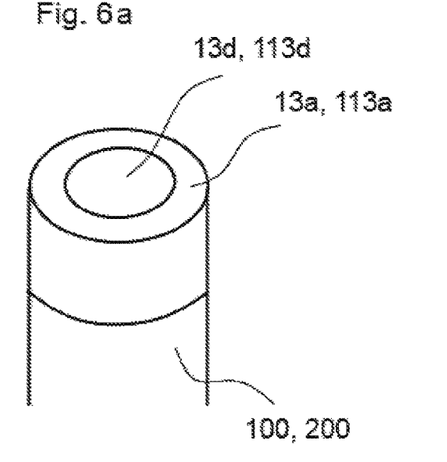
FIGS. 6a and 6b show two alternative embodiments for the location of the opening, according to the present invention.
Figure 6B:
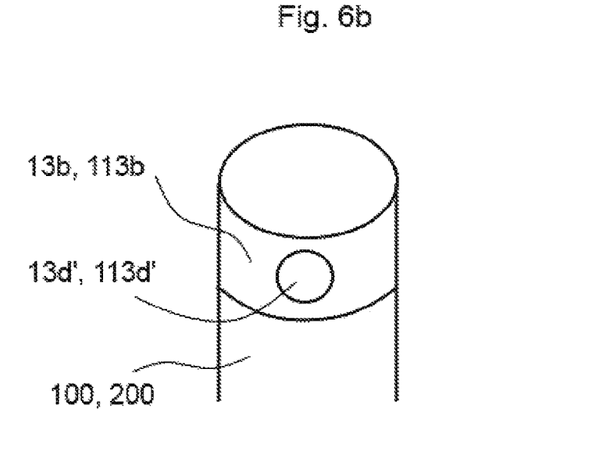

FIGS. 6a and 6b show two possible locations for the openings 13d, 113d (transponder 20, 120 and cover 14, 114 not shown for clarity). In FIG. 6a, the opening 13d, 113d is located on the top portion 13a, 113a of the shell element 13, 113. In FIG. 6b, the opening 13d, 113d is located in the side wall portion 13b, 113b of the shell element 13, 113. Both embodiments can be combined with any of the embodiments of the preceding figures.

While specific embodiments have been discussed, various modifications may of course be made, and the invention is not limited to the specific form or configuration of parts described herein, except insofar as such limitations are included in the following claims. It will be understood by the skilled person that sub-combinations are of utility and may be employed even without explicit reference to other features.

Dimensions mentioned in connection with the embodiments or shown in the figures do not limit the scope of the claims, either, but intend to provide an illustrative example.

REFERENCE SIGNS 10, 110 closure member
11, 111 closure element (screw cap)
11a, 111a top portion of closure element
11b, 111b side wall portion of closure element
12 sealing element
13, 113 electrically conductive shell element
13a, 113a top portion of the shell element
13b, 113b side wall portion of the shell element
13c, 113c end portion of the shell element
13d, 113d opening of the shell element
14, 114 cover element
14a, 114a central portion of cover element
14b, 114b outer circumferential portion of cover element
114c snap-fit leg portions of the cover element
115 pourer
116 washer
117 glass sphere (non-refillable system)
118 valve seat (non-refillable system)
119 upper sphere seat
20, 120 transponder (RFID-tag)
100, 200 bottle (container)

The invention claimed is:

1. Closure member (10, 110) for covering and/or closing a container (100, 200), in particular a bottle, the closure member (10, 110) comprising:
   a shell element (13, 113) comprising an opening (13d, 113d; 13d', 113d') provided in a top portion (13a, 113a) or a side portion (13b, 113b) of the shell element, the shell element (13, 113) being at least partially made of a conductive material, and
   a transponder (20, 120) comprising an antenna and being arranged in the closure member (10, 110) in or below the opening, the antenna being arranged at the opening (13d, 113d; 13d', 113d'), wherein the antenna is arranged at the same level, or below or under the opening, and wherein the dimension of the antenna ø$_{Antenna}$, the dimension of the opening in the shell ø$_{Hole}$, and the distance between the level of the opening and the antenna d obey the following relationship:

$$\text{ø}_{Hole}-\text{ø}_{Antenna} \geq 0.2d+2 \text{ mm for } d \geq 0.64 \text{ mm} \quad (I.)$$

$$\text{ø}_{Hole}-\text{ø}_{Antenna} \geq -4.96d-0.9 \text{ mm for } t \leq d < 0.64 \text{ mm} \quad (I'.)$$

with t being the thickness of the shell element (13, 113) at the opening.

2. Closure member (10, 110) according to claim 1, wherein the antenna is arranged at a distance of 1 mm or less from the level of the opening.

3. Closure member (10, 110) according to claim 1, wherein the shell element (13, 113) comprises a metallic material, in particular aluminum, wherein it is preferred that the shell element (13, 113) is an aluminum foil.

4. Closure member (10, 110) according to claim 1, wherein the closure member (10, 110) further comprises a closure element (11, 111), the closure element (11, 111) being configured to engage, directly or indirectly, with the container (100, 200), the closure element (11, 111) supporting the shell element (13, 113).

5. Closure member (10, 110) according to claim 4, wherein the transponder (20, 120) is provided on the closure element (11, 111).

6. Closure member (10, 110) according to claim 5, wherein a cover element (14, 114) is attached to the closure element (11, 111) by gluing, welding or a snap-fit connection.

7. Closure member (10, 110) according to claim 1, further comprising a cover element (14, 114), the cover element (14, 114) being made of a non-conductive material and being positioned such that the cover element (14, 114) closes the opening (13d, 113d) and covers the transponder.

8. Closure member (10, 110) according to claim 7, wherein the transponder (20, 120) has a circular shape and a central portion (14a, 114a) of the cover element (14, 114) covers the transponder (20, 120).

9. Closure member (10) according to claim 7, wherein a top portion (13a) of the shell element (13) covers an outer circumferential portion (14b) of the cover element (14).

10. Closure member (10, 110) for covering and/or closing a container (100, 200), in particular a bottle, the closure member (10, 110) comprising:
   a shell element (13, 113) comprising an opening (13d, 113d; 13d', 113d') provided in a top portion (13a, 113a) or a side portion (13b, 113b) of the shell element, the shell element (13, 113) being at least partially made of a conductive material, and
   a transponder (20, 120) comprising an antenna and being arranged in the closure member (10, 110) in or below the opening, the antenna being arranged at the opening (13d, 113d; 13d', 113d'), wherein the antenna is arranged at the same level, or below or under the opening, and wherein the dimension of the antenna $\varnothing_{Antenna}$ is smaller by at least 2 mm than the dimension of the opening in the shell $\varnothing_{Hole}$.

11. Closure member (10, 110) according to claim 10, wherein the antenna is arranged at a distance of 1 mm or less from the level of the opening.

12. Closure member (10, 110) according to claim 10, wherein the shell element (13, 113) comprises a metallic material, in particular aluminum, wherein it is preferred that the shell element (13, 113) is an aluminum foil.

13. Closure member (10, 110) according to claim 10, wherein the closure member (10, 110) further comprises a closure element (11, 111), the closure element (11, 111) being configured to engage, directly or indirectly, with the container (100, 200), the closure element (11, 111) supporting the shell element (13, 113).

14. Closure member (10, 110) according to claim 13, wherein the transponder (20, 120) is provided on the closure element (11, 111).

15. Closure member (10, 110) according to claim 14, wherein a cover element (14, 114) is attached to the closure element (11, 111) by gluing, welding or a snap-fit connection.

16. Closure member (10, 110) according to claim 10, further comprising a cover element (14, 114), the cover element (14, 114) being made of a non-conductive material and being positioned such that the cover element (14, 114) closes the opening (13d, 113d) and covers the transponder.

17. Closure member (10, 110) according to claim 16, wherein the transponder (20, 120) has a circular shape and a central portion (14a, 114a) of the cover element (14, 114) covers the transponder (20, 120).

18. Closure member (10) according to claim 16, wherein a top portion (13a) of the shell element (13) covers an outer circumferential portion (14b) of the cover element (14).

* * * * *